(12) United States Patent
Kasperchik et al.

(10) Patent No.: US 8,784,955 B2
(45) Date of Patent: *Jul. 22, 2014

(54) PRINTED ARTICLE

(75) Inventors: Vladek Kasperchik, Corvallis, OR (US); Jayprakash C. Bhatt, Corvallis, OR (US); Vladimir Jakubek, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/819,866

(22) PCT Filed: Oct. 22, 2010

(86) PCT No.: PCT/US2010/053695
§ 371 (c)(1),
(2), (4) Date: Feb. 28, 2013

(87) PCT Pub. No.: WO2012/054051
PCT Pub. Date: Apr. 26, 2012

(65) Prior Publication Data
US 2013/0164500 A1    Jun. 27, 2013

(51) Int. Cl.
*B41M 5/50* (2006.01)
*B41M 5/00* (2006.01)
*C09D 11/322* (2014.01)
*C09D 11/00* (2014.01)
*B05D 5/06* (2006.01)

(52) U.S. Cl.
CPC ............ *B41M 5/508* (2013.01); *B41M 5/0023* (2013.01); *C09D 11/322* (2013.01); *B05D 5/067* (2013.01)
USPC .................... 428/32.32; 428/32.24; 428/207; 106/31.65; 106/31.9; 347/100

(58) Field of Classification Search
CPC ........ B41M 3/008; B41M 5/50; B41M 5/502; B41M 5/503; B41M 5/0023; B41M 5/508; B41J 2/215; B05D 5/067; C09D 11/037; C09D 11/322
USPC ........ 428/32.32, 32.24, 207; 106/31.65, 31.9; 346/135.1; 427/265; 347/100
See application file for complete search history.

(56) References Cited

U.S. PATENT DOCUMENTS

| | | |
|---|---|---|
| 5,624,486 A | 4/1997 | Schmid et al. |
| 6,884,289 B2 | 4/2005 | Schoen et al. |
| 7,416,639 B2 | 8/2008 | Yoshino et al. |
| 7,744,179 B2 | 6/2010 | Doi et al. |
| 2004/0109958 A1 | 6/2004 | Nigam et al. |
| 2007/0022901 A1 | 2/2007 | Kurze et al. |
| 2007/0034112 A1 | 2/2007 | Mronga et al. |
| 2009/0255442 A1 | 10/2009 | Hollman et al. |

OTHER PUBLICATIONS

International Search Report and Written Opinion for PCT/US2010/053695 dated Jun. 30, 2011 (10 pages).

*Primary Examiner* — Bruce H Hess
(74) *Attorney, Agent, or Firm* — Sandra Beccarelli

(57) ABSTRACT

A printed article with metallic luster and gold-like appearance that encompasses a printable media on which a printed feature has been formed with an ink composition. The ink composition contains iron oxide pigment particles that have an average particle 5 size in the range of about 3 to about 300 nm and the printable media contains a bottom supporting substrate and an ink-absorbing layer with pore diameters that are smaller than the average size of the iron oxide pigment particles. In such printed article, the ink composition forms onto the printable media a printed feature that has a thickness that is below about 300 nm.

15 Claims, 2 Drawing Sheets

PRINTED ARTICLE

BACKGROUND

Inkjet technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of substrates. Current inkjet printing technology involves forcing the ink drops through small nozzles by thermal ejection, piezoelectric pressure or oscillation, onto the surface of a media. In inkjet printing method, both the media and the ink play a key role in the overall image quality and permanence of the printed images and articles. Thus, it has often created challenges to find media and ink which can be effectively used with such printing techniques and which imparts good image quality. In addition, nowadays, prints and printed articles with specific characteristics and appearances are often wanted.

As expanded colors and appearances are sought for home and office decorative printing, developments have been made to provide prints and printed articles with specific features, such as for examples, metallic appearances or reflectivity. However, inks and printed articles with such specific features are noticeably limited among available options due, for examples, to the cost or to the ineffectiveness for home and office use.

Accordingly, investigations continue into developing media, ink and/or printed articles that exhibit specific properties such as, for example, metallic luster and/or gold-like appearance.

BRIEF DESCRIPTION OF THE DRAWING

The drawings illustrate various embodiments of the present system and method and are part of the specification.

DETAILED DESCRIPTION

Before particular embodiments are disclosed and described, it is to be understood that the present disclosure is not limited to the particular process and materials disclosed herein. It is also to be understood that the terminology used herein is used for describing particular embodiments only and is not intended to be limiting, as the scope of the present invention will be defined only by the claims and equivalents thereof. The following terminology will be used: the singular forms "a", "an" and "the" include plural referents unless the context clearly dictates otherwise. Thus, for example, reference to "a pigment" includes reference to one or more of such materials. Concentrations, amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt % and sub-ranges such as 5 wt % to 15 wt %, 10 wt % to 20 wt %, etc. Wt % means herein percentage by weight. All percents are by weight unless otherwise indicated.

The present disclosure refers to a printed article that has a metallic luster and a gold-like appearance. Said printed article includes a printable media on which a printed feature has been formed with an ink composition, said ink composition forms onto said media a printed feature that has a thickness that is below about 300 nm.

As described herein, the ink composition that is applied to the printable media contains iron oxide pigment particles that have an average particle size in the range of about 3 to about 300 nm. The printable media contains a bottom supporting substrate and an ink-absorbing layer with pore diameters that are smaller than the size of the iron oxide pigment particles.

Figure 1:
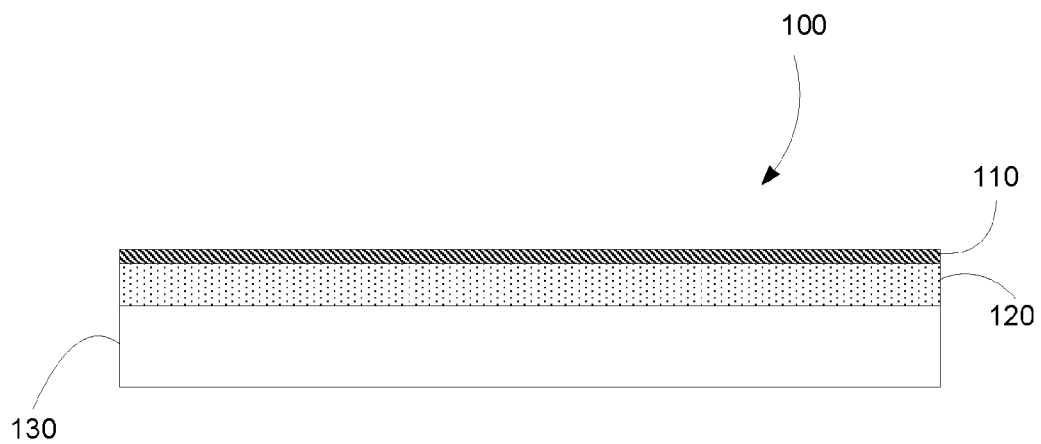
FIG. 1 is a cross-sectional view of a printed article, with a coating layer and a printed feature applied to one side of the supporting substrate, according to some embodiments of the present disclosure.
Figure 2:
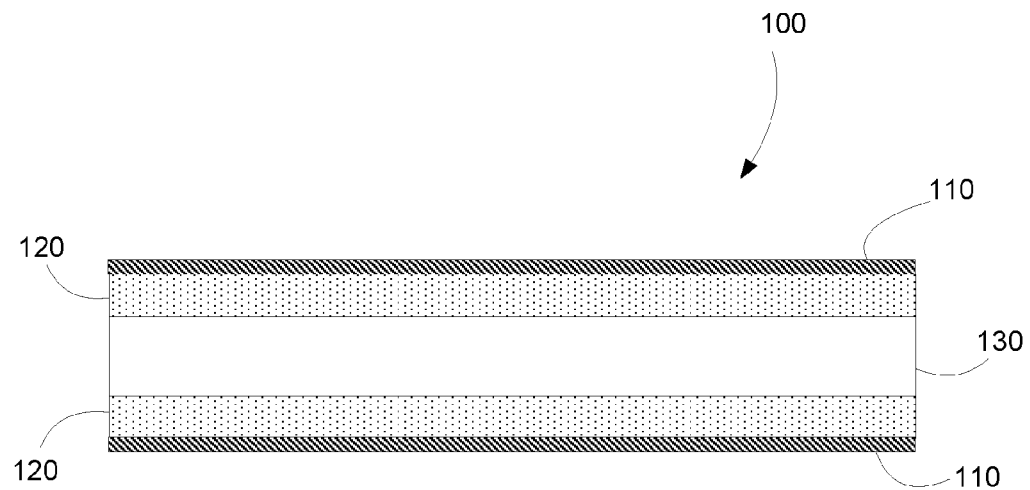
FIG. 2 is a cross-sectional view of a printed article, including coating layers and printed features that are applied to both sides of the supporting substrate, according to some embodiments of the present disclosure.

In some examples, such as illustrated in FIGS. 1 and 2, the printed article (100) contains a printed feature (110) and a printable media that encompass an ink-absorbing layer (120) and bottom supporting substrate (130).

Such as illustrated in FIG. 1, the printed feature (110) and the ink-absorbing layer (120) can be applied to only one side of the supporting substrate (130). If the coated side is used as an image-receiving side, the other side, i.e. backside, may not have any coating at all, or may be coated with other chemicals (e.g. sizing agents) or coatings to meet certain features such as to balance the curl of the final product or to improve sheet feeding in printer. Such as illustrated in FIG. 2, the printed feature (110) and the ink-absorbing layer (120) can be applied to both opposing sides of the supporting substrate (130).

Figure 3:
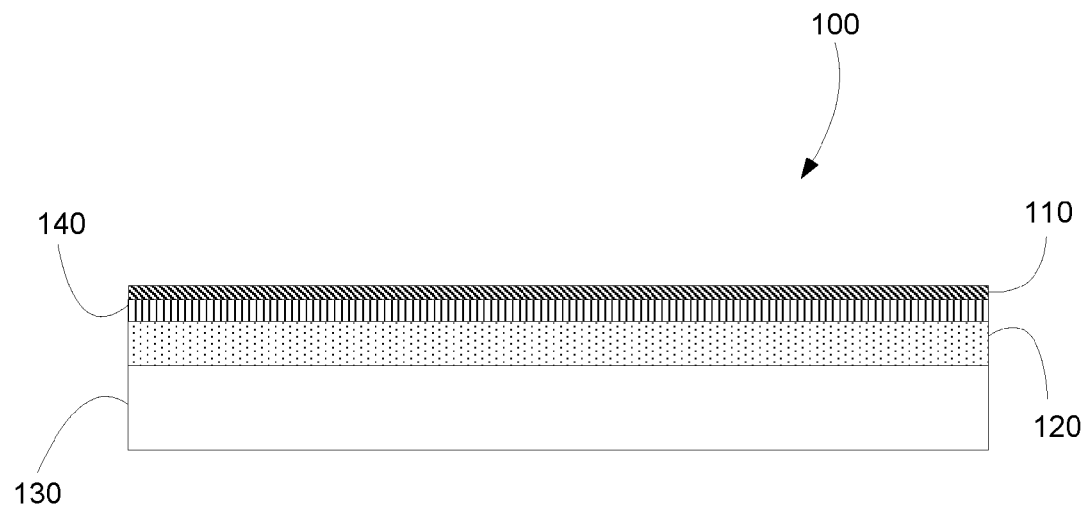
FIG. 3 is a cross-sectional view of a printed article, including coating layers and printed feature that are applied to one side of the supporting substrate, according to some other embodiments of the present disclosure.
Figure 4:
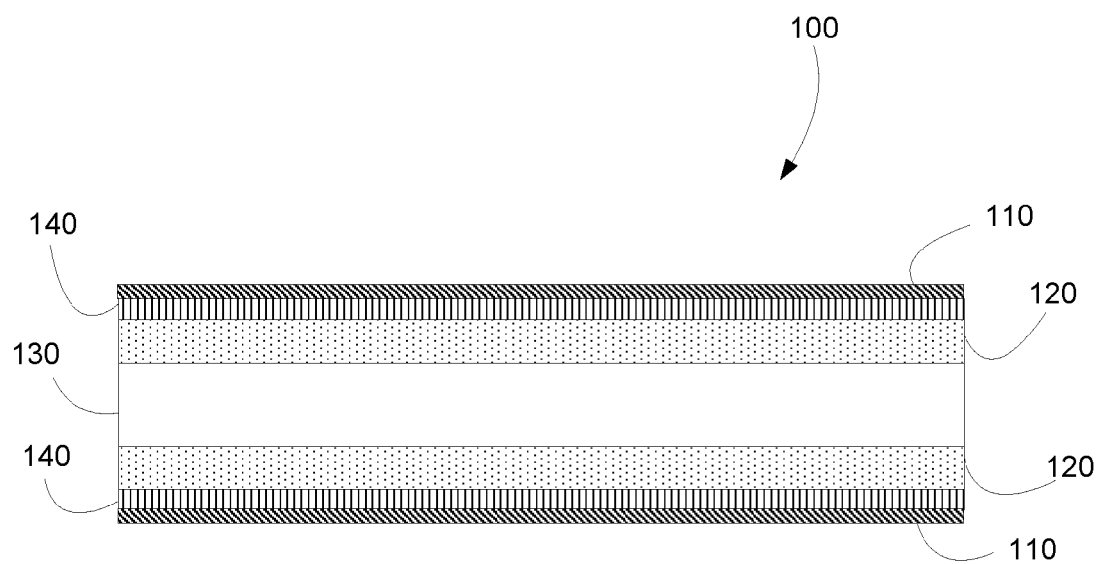
FIG. 4 is a cross-sectional view of a printed article, including coating layers and printed feature that are applied to both sides of the supporting substrate, according to some other embodiments of the present disclosure.

In some examples, as illustrated in FIGS. 3 and 4, the printed article (100) contains the printed feature (110) and a printable media that encompasses a supporting substrate (130), an ink-absorbing layer (120) applied to at least one surface of said substrate (130) and a glossy porous protective layer (140) applied over the ink-absorbing layer (120). The printed feature (110) is printed over the glossy porous protective layer (140). In some examples, such as illustrated in FIG. 3, the printable media encompass a glossy porous protective layer (140) and an ink-absorbing layer (120) that are applied to only one side of the supporting substrate (130). In some other examples, such as illustrated in FIG. 4, the printable media encompass a glossy porous protective layer (140) and an ink-absorbing layer (120) that are applied to both opposing sides of the supporting substrate (130). The double-side coated medium has a sandwich structure, i.e. both sides of the supporting substrate (130) are coated with the same coating and both sides may be printed with printed feature (110).

The printed article such as defined herein is a printable media on which a printed feature has been formed using printing technique. In some examples, such printing technique is an inkjet printing technique. The printed feature has been formed by application of a specific ink composition that contains iron oxide pigment particles that have an average particle size in the range of about 3 to about 300 nm.

The ink composition forms thus, on the printable media, a uniform coating with strong metallic reflective appearance. Said uniform coating with strong metallic reflective appearance is defined herein as the iron oxide coating or as the printed feature. The resulting printed article exhibits therefore a metallic luster and gold-like appearance.

By "metallic luster", it is meant herein that the printed article has an opaque or a semi-opaque appearance and reflects the light as a metal reflects it. The printed article interacts with the light and has a shiny metal appearance. The printed article has thus specific optical properties: it exhibits a sort of glow from reflected light and has the tendency to reflect at specular angle when exposed to directional light source.

By "gold-like appearance", it is meant herein that the printed article has a visual appearance of gold-plated surface and has the color of metallic gold (Au). However, the printed article does not contain any gold or other elemental metal particles. The printed article exhibits thus gloss and sheen as a gold object does.

The printed article of the present disclosure can be useful for forming printed images that have, for examples, decorative applications, such as greeting cards, scrapbooks, brochures, book covers, signboards, business cards, certificates and other like applications.

The ink composition, containing iron oxide pigment particles, forms onto the above-mentioned printable media, a printed feature (110) that can be considered as an iron oxide coating. Said printed feature (110), or iron oxide coating, has a thickness that is smaller than about 300 nm. In some examples, the printed feature (110) has a thickness that is between about 3 and about 200 nm. In some other examples, the printed feature (110) has a thickness that is between about 10 nm and about 120 nm.

In some examples, the printed feature, or iron oxide coating, (110) of the printed article (100) has a density in the range about 2 to about 80 µg/cm². In some other examples, the printed feature (110) has a density in the range of about 4 to about 60 µg/cm²; and, in yet some other examples, in the range of about 10 to about 40 µg/cm². The printed feature, or iron oxide coating, (110) can be formed by using inkjet printing technique.

The ink composition used to form the printed feature (110), or iron oxide coating, of the printed article (100) contains iron oxide pigment particles. As "iron oxide", it is meant herein any chemical compounds composed of iron and oxygen. The term iron oxides encompass thus iron oxides, iron hydroxides or oxide/hydroxides Examples of iron oxides include iron (II) oxide (wüstite, FeO), iron (II,III) oxide (magnetite, $Fe_3O_4$) and iron (III) oxide (hematite, $Fe_2O_3$). Examples of iron hydroxides include iron (II) hydroxide ($Fe(OH)_2$) and iron (III) hydroxide ($Fe(OH)_3$). Without being linked by any theory, it is believed that magnetite ($Fe_3O_4$) and hematite ($Fe_2O_3$) are oxidatively stable in aqueous environment; however, wüstite (FeO) is oxidatively unstable and can readily revert to $Fe_2O_3$ or $Fe_3O_4$.

In some examples, the ink composition used to form the printed feature, or iron oxide coating, (110) of the printed article (100) contains magnetite ($Fe_3O_4$) as iron oxide pigment. The ink composition can contain stable colloidal dispersions of inorganic iron oxide particles, such as magnetite ($Fe_3O_4$) and hematite ($Fe_2O_3$). In some examples, the ink composition contains an ink vehicle and a colloid dispersion of iron oxide particles.

The average particle size of iron oxides is in the range of about 3 to about 300 nm. In some examples, the average particle size of iron oxides is in the range of about 5 to about 200 nm and, in some other examples, in the range of about 10 to about 100 nm.

The ink composition can contain an aqueous ink vehicle and an amount of iron oxide, such as $Fe_3O_4$, that is between 0.1 and 15 wt % of the total weight of the ink composition. In some examples, the iron oxide particles are present in an amount representing from about 0.2 to about 12 wt %. In some other examples, the iron oxide particles are present in an amount representing from about 0.5 to about 6 wt % of the total weight of the ink composition.

The iron oxide particles, such as $Fe_3O_4$, can be dispersed with dispersants. Examples of suitable dispersants include, but are not limited to, water-soluble anionic species of low and high molecular weight such as phosphates and polyphosphates, phosphonates and polyphosphonates, phosphinates and polyphosphinates, carboxylates (such as citric acid or oleic acid), polycarboxylates (such as acrylates and methacrylates). Other examples include hydrolysable alkoxysilanes with alkoxy group attached to water-soluble (hydrophilic) moieties such as water-soluble polyether oligomer chains. In some examples, the dispersant used to disperse iron oxide particles, such as $Fe_3O_4$, is a polyether alkoxysilane dispersant.

Examples of polyether alkoxysilane dispersants used to dispersed iron oxide particles can represented by the following general Formula (I):

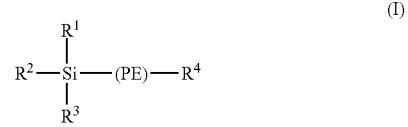

(I)

Wherein:
a) $R^1$, $R^2$ and $R^3$ are hydroxy groups, linear or branched alkoxy groups. In some examples, $R^1$, $R^2$ and $R^3$ are linear alkoxy groups having from 1 to 5 carbon atoms. In some other examples, $R^1$, $R^2$ and $R^3$ groups are —$OCH_3$ or —$OC_2H_5$.
b) PE is a polyether oligomer chain segment of the structural formula $[(CH_2)_n—CH(R)—O]_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment (—$CH_2CH_2$—O—), or polypropylene glycol (PPG) chain segment (—$CH_2$—$CH(CH_3)$—O—), or a mixture of both types. In some examples, the polyether chain segment (PE) contains PEG units (—$CH_2CH_2$—O—);
c) $R^4$ is hydrogen, or a linear or a branched alkyl group. In some examples, $R^4$ is an alkyl group having from 1 to 5 carbon atoms.

Other examples of dispersants, used to disperse iron oxide particles, can be a polyether alkoxysilane dispersant having the following general Formula (II):

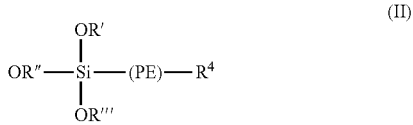

(II)

wherein R', R" and R'" are linear or branched alkyl groups. In some examples, R', R" and R'" are linear alkyl groups having from 1 to 3 carbon atoms in chain length. In some examples, R', R" and R'"—$CH_3$ or —$C_2H_5$. $R^4$ and PE are as described above for Formula (I); i.e. PE is a polyether oligomer chain segment of the structural formula: $[(CH_2)_n\text{—}CH\text{—}R\text{—}O]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is $CH_3$ or $C_2H_5$.

In some examples, the iron oxide particles, such as $Fe_3O_4$, present in the ink composition, are dispersed with polyether alkoxysilanes. Examples of suitable polyether alkoxysilanes include $(CH_3O)_3Si\text{—}(CH_2CH_2O)_{n'}H$; $(CH_3CH_2O)_3Si\text{—}(CH_2CH_2O)_{n'}H$; $(CH_3O)_3Si\text{—}(CH_2CH_2O)_{n'}CH_3$; $(CH_3CH_2O)_3Si\text{—}(CH_2CH_2O)_{n'}CH_3$; $(CH_3O)_3Si\text{—}(CH_2CH_2O)_{n'}CH_2CH_3$; $(CH_3CH_2O)_3Si\text{—}(CH_2CH_2O)_{n'}CH_2CH_3$; $(CH_3O)_3Si\text{—}(CH_2CH(CH_3)O)_{n'}H$; $(CH_3CH_2O)_3Si\text{—}(CH_2CH(CH_3)O)_{n'}H$; $(CH_3O)_3Si\text{—}(CH_2CH(CH_3)O)_{n'}CH_3$; $(CH_3CH_2O)_3Si\text{—}(CH_2CH(CH_3)O)_{n'}CH_3$; wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, Silquest® A-1230 manufactured by Momentive Performance Materials and Dynasylan® 4144 manufactured by Evonik/Degussa.

The amount of dispersant used in the iron oxide dispersion may vary from about 1 wt % to about 300 wt % of the iron oxide particles content. In some examples, the dispersant content range is between about 2 to about 150 wt % of the iron oxide particles content. In some other examples, the dispersant content range is between about 5 to about 100 wt % of the iron oxide particles content. In some examples, the ink composition is based on fine particles of iron oxide dispersion, such as $Fe_3O_4$, in an aqueous ink vehicle. The dispersion of iron oxide particles, such as $Fe_3O_4$, can be prepared via milling or dispersing $Fe_3O_4$ powder in water in the presence of suitable dispersants.

The iron oxide, such as $Fe_3O_4$ pigment dispersion, may be prepared by milling commercially available inorganic oxide pigment having large particle size (in the micron range) in the presence of the dispersants described above until the desired particle size is achieved. The starting dispersion to be milled is an aqueous dispersion with solid content up to 40% by weight (wt %) of the iron oxide pigment. The milling equipment that can be used is a bead mill, which is a wet grinding machine capable of using very fine beads having diameters of less than 1.0 mm as the grinding medium, for example, Ultra-Apex Bead Mills from Kotobuki Industries Co. Ltd. The milling duration, rotor speed and temperature may be adjusted as known to those skilled in the art to achieve the results desired.

The pH of the ink may be in the range of about 3 to about 11. In some examples, the pH of the ink is from about 5 to about 9 and, in some other examples, from about 5.5 to about 9.0. The pH of the ink composition may be adjusted by addition of organic or inorganic acids or bases, i.e. pH adjusting agent. The ink composition can have a viscosity within the range of about 1.0 to about 10 cps, or within the range of about 1.0 to about 7.0 cps, as measured at 25° C.

As used herein, "liquid vehicle" is defined to include any liquid composition that is used to carry iron oxide particles dispersion, such as $Fe_3O_4$, to the substrate. A wide variety of liquid vehicle components may be used herein. Such liquid vehicle may include a mixture of a variety of different agents, including without limitation, surfactants, solvent and co-solvents, buffers, biocides, viscosity modifiers and water. In some examples, the liquid vehicle is an inkjet liquid vehicle. Organic solvents can be part of the liquid vehicle. Any suitable organic solvents can be used. Examples of suitable classes of organic solvents include polar solvents such as amides, esters, ketones, lactones and ethers. Examples of organic solvents also include 2-pyrrolidone, N-methylpyrrolidone (NMP), dimethyl sulfoxide, sulfolane and glycol ethers. The solvent can be used in an amount representing from about 0.1 to about 30 weight percentage of the ink composition or can be used in an amount representing from about 8 to about 25 weight percentage of the ink composition. The ink composition can include water. Such water can be used as the ink carrier for the composition and can be part of the liquid vehicle. The water can make up the balance of the ink composition and may be present in an amount representing from about 40 to about 90 wt %, or may be present in an amount representing from about 50 to about 80 wt % by weight of the total composition. In addition to water, various types of agents may be employed in the ink composition to optimize the properties of the ink composition for specific applications. The ink composition may also include any number of buffering agents and/or biocides. Examples of suitable biocides include, but are in no way limited to, benzoate salts, sorbate salts, commercial products such as Nuosept® (ISP), Ucarcide® (Dow), Vancide® (RT Vanderbilt Co.) and Proxel® (Avecia), Kordek® MLX (Rohm and Haas) and other known biocides. Such biocides may be contained in amount representing less than about 5 weight percentage of the ink composition. Surfactants can also be used and may include water-soluble surfactants such as alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, fluorosurfactants and mixtures thereof. In some examples, fluorosurfactants or ethoxylated surfactants can be used as surfactants. In some other examples, ethoxylated silicone based surfactants are used. If used, the surfactant can be present at from about 0.001 to about 10 wt % and, in some examples, can be present at from about 0.001 to about 0.1 wt % of the ink composition. The ink composition may also include different types of polymer for enhancing rub, scratch durability of printed feature.

Such as illustrated in FIGS. 1 to 4, the printed article (100) contains a printed feature (110) and a printable media that encompass an ink-absorbing layer (120) and bottom supporting substrate (130). In some examples, as illustrated in FIGS. 3 and 4, the printed article (100) contains a printed feature (110) and a printable media that encompasses a supporting substrate (130), a porous ink-absorbing layer (120) and a glossy porous protective layer (140) applied over the ink-absorbing layer (120). The printable media is capable of receiving a printed feature (110) that includes iron oxide particles, such as $Fe_3O_4$ and that has a thickness smaller than about 300 nm. In some examples, the media has a multilayered structure and is capable of producing gold-luster prints when being printed with the above described ink formulation.

The printable media used in the printed article (100) such as described herein encompass an ink-absorbing layer (120)

having pore diameters that are smaller than the average size of the iron oxide pigment particles, such as $Fe_3O_4$ present in the ink composition. Said ink-absorbing layer is thus capable to absorb the liquid phase of the ink into the pores while retaining the iron oxide particles on the print surface. Without being linked by any theory, it is believed that such sucking action of the ink-absorbing layer (120) forces the iron oxide particles to form the thin smooth iron oxide layer, i.e. the printed feature that will have good optical reflectivity.

The printable media has an ink-absorbing layer (120) having pore diameters that are smaller than 300 nm; in some examples, that are smaller than 200 nm; in some other examples, that are smaller than 150 nm. In yet some other examples, the printable media have an ink-absorbing layer (120) that has pore diameters that are smaller than 3 nm. In some examples, the ink-absorbing layer (120) has an absorption capacity (porosity) ranging from about 0.6 to about 1.2 liter/gram. In some other examples, the porous ink-absorbing layer (120) has a coat-weight in the range of about 10 to 40 g/m² or in the range of about 15 to about 30 g/m².

The ink-absorbing layer (120) can include inorganic pigments in particulate form and, at least, one binder. The ink-absorbing layer (120) can include inorganic particulates. Suitable inorganic pigments include metal oxides and/or semi-metal oxides particles. The inorganic semi-metal oxide or metal oxide particles may be independently selected from silica, alumina, boehmite, silicates (such as aluminum silicate, magnesium silicate and the like), titania, zirconia, calcium carbonate, clays, or combinations thereof. The inorganic pigment can be fumed alumina or fumed silica. In some examples, the inorganic pigments particles are fumed silica (modified or unmodified). Thus, the inorganic particles pigments can include any number of inorganic oxide groups including, but not limited to silica and/or alumina, including those treated with silane coupling agents containing functional groups or other agents such as aluminum chloro-hydrate (ACH) and those having oxide/hydroxide. If silica is used, it can be selected from the following group of commercially available fumed silica: Cab-O-Sil®LM-150, Cab-O-Sil®M-5, Cab-O-Sil®MS-55, Cab-O-Sil®MS-75D, Cab-O-Sil®H-5, Cab-O-Sil®HS-5, Cab-O-Sil®EH-5, Aerosil®150, Aerosil®200, Aerosil®300, Aerosil®350 and/or Aerosil®400.

In some examples, the aggregate size of the fumed silica can be from approximately 50 to 300 nm in size. In some other examples, the fumed silica can be from approximately 100 to 250 nm in size. The Brunauer-Emmett-Teller (BET) surface area of the fumed silica can be from approximately 100 to 400 square meters per gram. In yet some other examples, the fumed silica can have a BET surface area from approximately 150 to 300 square meters per gram. The inorganic particles pigments can be alumina (modified or unmodified). In some examples, the alumina coating can comprise pseudo-boehmite, which is aluminum oxide/hydroxide ($Al_2O_3 \cdot nH_2O$ where n is from 1 to 1.5). Commercially available alumina particles can also be used, including, but not limited to, Sasol Disperal®HP10, Disperal®HP 14, boehmite, Cabot Cab-O-Sperse®PG003 and/or CabotSpectrAl®81 fumed alumina.

In some examples, the ink-absorption layer (120) contains fumed silica or fumed aluminas that are aggregates of primary particles. In some other examples, the ink-absorption layer (120) contains fumed silica or fumed alumina that are aggregates of primary particles that have an average particle size ranging from about 120 nm to about 250 nm. The amount of inorganic pigment may be from about 30 to 90 by weight (wt %) based on the total weight of the ink-absorbing layer. A binder can be added to the ink-absorption layer (120) to bind the particulates together. In some examples, an amount of binder is added that provides a balance between binding strength and maintaining particulate surface voids and interparticle spaces for allowing ink to be absorbed. The binders may be selected from polymeric binders. In some examples, the binders are water-soluble polymers and polymer latexes. Examples of binders, for use herein, include, but are not limited to polyvinyl alcohols and water-soluble copolymers thereof, e.g., copolymers of polyvinyl alcohol and poly(ethylene oxide) or copolymers of polyvinyl alcohol and polyvinylamine; cationic polyvinyl alcohols; aceto-acetylated polyvinyl alcohols; polyvinyl acetates; polyvinyl pyrrolidones including copolymers of polyvinyl pyrrolidone and polyvinyl acetate; gelatin; silyl-modified polyvinyl alcohol; styrene-butadiene copolymer; acrylic polymer latexes; ethylene-vinyl acetate copolymers; polyurethane resin; polyester resin; and combination thereof. In some examples, the binder is polyvinylalcohol with percentage hydrolysis between 80 to 90% and 4% viscosity higher than 30 cps at 25° C. Examples of binders include Poval®235, Mowiol®56-88, Mowiol®40-88 (products of Kuraray and Clariant). In some examples, the binder may be present in an amount representing of about 5 wt % to about 30 wt % by total weight of the ink-absorbing layer (120).

The printable media (100) contains a supporting substrate (130) that acts as a bottom substrate layer. The ink-absorbing layer (120) forms a coating layer on said supporting substrate (130) and, in other word, forms a recording material that is well adapted for inkjet printing device. The supporting substrate (130), which supports the ink-absorbing layer (120), may take the form of a sheet, a web, or a three-dimensional object of various shapes. The supporting substrate (130) can be of any type and size. The supporting substrate (130) can be any material that will be able to provide a mechanical support to the above mentioned layers. In some examples, the supporting substrate can be a flexible film or a rigid paper substrate. As non-limiting examples, the supporting substrate (130) may be selected from cellulosic or synthetic paper (coated or uncoated), cardboard, polymeric film (e.g. plastic sheet like PET, polycarbonate, polyethylene, polypropylene), fabric, cloth and other textiles. In some other examples, the bottom substrate layer may be single material plastic film made from PET, polyimide or another suitable polymer film with adequate mechanical properties. In some examples, the supporting substrate (130) includes any substrate that is suitable for use in digital color imaging devices, such as electrophotographic and/or inkjet imaging devices, including, but in no way limiting to, resin coated papers (so-called photobase papers), papers, overhead projector plastics, coated papers, fabrics, art papers (e.g. water color paper), plastic film of any kind and the like. The substrate includes porous and non-porous surfaces. In some other examples, the supporting substrate (130) is paper (non-limitative examples of which include plain copy paper or papers having recycled fibers therein) or photopaper (non-limitative examples of which include polyethylene or polypropylene extruded on one or both sides of paper) and/or combinations thereof.

In some examples, the supporting substrate (130) is a photobase. Photobase is a coated photographic paper, which includes a paper base extruded one or both sides with polymers, such as polyethylene and polypropylene. Photobase support can include a photobase material including a highly sized paper extruded with a layer of polyethylene on both sides. In this regard, the photobase support is an opaque water-resistant material exhibiting qualities of silver halide paper. In some examples, the photobase support includes a polyethylene layer having a thickness of about 10 to 24 grams per square meter (g/m² or gsm). The photobase support can also be made of transparent or opaque photographic material.

In some examples, the ink-absorbing layer (120) are disposed on the supporting substrate (130) and form a coating layer having a coat weight which is in the range of about 10 to about 75 gram per square meter (g/m² or gsm) per side. In some examples, the supporting substrate (130) has a thickness along substantially the entire length ranging between about 0.025 mm and about 0.5 mm.

In some examples, the printable medium can include a glossy porous layer (140). Said layer (140) is a protective porous layer that could be applied above the ink-absorbing layer (120) in view of receiving the printed feature (110). When present, the glossy protective layer (140) is a porous layer having pore diameters that are smaller than the average size of the iron oxide particles of the ink composition applied to form the printed feature (110). Without being linked by any theory, it is believed that this layer help to maximize retention of iron oxide pigment particles, such as $Fe_3O_4$ particles, on the media surface, as well as to boost the specular reflectivity of the printed feature (110) in order to enable its metallic and gold-like luster. It is also believed that the glossy protective layer (140) helps to improve the surface gloss of the media and helps to improve the scratch resistance.

In some examples, the coat weight of the gloss layer (140) can be from about 0.1 g/m² to about 2 g/m² and, in some other examples, the coat weight of the gloss layer can be from about 0.25 g/m² to about 1.0 g/m².

The glossy protective layer (140) can contain inorganic colloidal particles such as colloidal particles of metal oxides and semi-metal oxides or colloidal silica particles and water-soluble binders, such as polyvinylalcohol or copolymers of vinylpyrrolidone. In some examples, the glossy protective layer (140) contains of highly porous metal or semi-metal oxide pigments particles (or combination of both). The average particle size, as measured by diameter, of the inorganic colloidal particles, present in the middle porous layer (140), can be from about 5 nm to about 150 nm. In some examples, the average particle size can be from about 20 nm to about 100 nm. In some other examples, the average particle size can be from about 30 nm to about 80 nm. Inorganic colloidal particles can be selected from the group consisting of silica, clay, kaolin, calcium carbonate, talc, titanium dioxide and zeolites. In some examples, inorganic colloidal particles present in the middle porous layer (140) can be inorganic oxide colloidal particles such as colloidal silica, aluminum oxides (boehmites) and mixture of them. In some examples, the inorganic colloidal particles are colloidal silica particles. In some other examples, middle porous layer (140) contains spherical colloidal silicas with average particle size ranging from about 30 to about 80 nm. The porosity of the glossy porous layer may be less than about 0.2 liter/gram. The middle porous layer (140) can contain binders. Such binders can be polyvinylalcohol or copolymer of vinylpyrrolidone. The copolymer of vinylpyrrolidone can include various other copolymerized monomers, such as methyl acrylates, methyl methacrylate, ethyl acrylate, hydroxyethyl acrylate, hydroxyethyl methacrylate, ethylene, vinylacetates, vinylimidazole, vinylpyridine, vinylcaprolactams, methyl vinylether, maleic anhydride, vinylamides, vinylchloride, vinylidene chloride, dimethylaminoethyl methacrylate, acrylamide, methacrylamide, acrylonitrile, styrene, acrylic acid, sodium vinylsulfonate, vinylpropionate and methyl vinylketone, etc. The porous layer (140) can contain colloidal silica and greater than 5 wt % of polyvinylalcohol. In some examples, binders can be present in the middle porous layer (140) at from about 1 wt % to about 15 wt % by weight based on the total dry weight of inorganic colloidal particles.

In some examples, such as illustrated in FIG. 3, the glossy porous protective layer (140) and the ink-absorbing layer (120) are applied to only one side of the supporting substrate (130). If the coated side is used as an image-receiving side, the other side, i.e. backside, may not have any coating at all, or may be coated with other chemicals (e.g. sizing agents) or coatings to meet certain features such as to balance the curl of the final product or to improve sheet feeding in printer. In some other examples, such as illustrated in FIG. 4, the glossy porous protective layer (140) and the ink-absorbing layer (120) are applied to both opposing sides of the supporting substrate (130). The double-side coated medium has a sandwich structure, i.e., both sides of the supporting substrate (130) are coated with the same coating and both sides may be printed with printed feature (110).

In some examples, the printable media is an inkjet textured media. By texture media, it is meant herein a media with macroscopically textured surface. As textured surface, it is meant herein that the surface is not smooth and presents apparent physical features. The sizes of the texture features on the media surface are thus macroscopic, i.e. large enough to be seen by human eye from normal viewing distance. In some examples, as regular human eye can resolve features as small as 0.35 mm from 1 m viewing distance, the average size of texture features on the media surface are superior to, at least, about 0.3 mm.

The textured printable media can be obtained by embossing a pattern into media via passing said media between rollers with patterned surface. Thus, the printed article is a textured printed article with optically variable properties and has a metallic appearance.

With application of the light onto the textured printed article, its angles of specular reflection are varying with texture topography. Therefore, variations of the reflective angles create multiple specular reflections off the print surface. These multiple reflections are perceived as a "sparkle" effect. Thus, the human observer can see specular reflections and, hence, perceives metallic appearance of the print. In some examples, the textured printed article, illuminated by directional light source, is viewed as a pattern of highly contrasting light and dark areas (the light areas are the spots on textured surface that are viewed at specular angle, while the dark ones are areas of the surface which are off specular angle). The combination of dark and light areas on the print creates "sparkle" effect and enhances "metallic" appearance of the print.

In some examples, a method for forming a printed article on a printable media encompasses projecting a stream of droplets of ink composition containing iron oxide pigment particles, such as $Fe_3O_4$ particles, that have an average particle size in the range of about 3 to about 300 nm onto a printable media, in view of forming a gold-like appearance printed feature (110) that has a thickness smaller than about 300 nm. Said printable media has a porous ink-absorbing layer with pore diameters that are smaller than the average size of the iron oxide particles applied to form the printed feature (110). In some other examples, the printable media has, in addition, a glossy porous protective layer (140) with mean pore diameters that are smaller than the average size of the iron oxide particles applied to form the printed feature (110). In yet some other examples, the printable media is a textured printable media.

In some examples, the projection of the stream of droplets of ink composition, onto the printable media, is done via inkjet printing technique. The ink composition may be established on the material via any suitable inkjet printing technique. Non-limitative examples of such inkjet printing technique include thermal, acoustic, continuous and piezoelectric inkjet printing. By inkjet composition, it is meant herein that the composition is very well adapted to be used in an inkjet device and/or in an inkjet printing process. The resulting printed article forms a uniform coating layer that exhibits a metallic luster and gold-like appearance.

The preceding description has been presented only to illustrate and describe embodiments of the present invention. However, it is to be understood that the following are only illustrative of the application of the principles of the present print media and methods.

Example

A dispersion of iron metal oxides is prepared. Such dispersion is produced by milling $Fe_3O_4$ powder (available from "Inframat Advanced Materials") in a "Kotobuki" Ultra-Apex Bead Mill (UAM-015) with a dispersant. The milling dispersant used is Silquest®A-1230 (available from "Momentive Performance Materials") at Dispersant/Pigment ratio equal to 0.5. The resulting $Fe_3O_4$ dispersion contains 5.5 wt % of metal oxide $Fe_3O_4$. The average particle size of $Fe_3O_4$ is about 32 nm (as measured by "Nanotrac" particle size analyzer). The dispersion in then used to produce the ink composition such as illustrated in the Table (a) below.

TABLE (a)

| Ink formulation | Wt % |
| --- | --- |
| $Fe_3O_4$ Dispersion | 36.2 |
| LEG-1 | 5.0 |
| 2-Pyrrolidinone | 9.0 |
| Trizma ®Base | 0.2 |
| Proxel ®GXL | 0.1 |
| Surfynol ®465 | 0.2 |
| Water | Up to 100 % |

LEG-1 a co-solvent available from Liponics. Trizma®Base is available from Sigma Aldrich Inc. Proxel®GXL is a biocide available from Avecia Inc. Surfynol®465 is a surfactant available from Air Products.

A printable recording medium is produced with a single pass (wet-on-wet) coating method using a curtain coater. The ink-absorbing layer and, eventually, a glossy layer are applied onto a photobase ("HP Advanced PhotoPaper") as supporting substrate (166 or 171 g/m² raw base paper). The ink-absorbing layer is applied first to the front side of the photo paper with a roller coater. When present, the glossy layer is coated on the top of the ink-absorbing layer. The coat weight of the absorbing layer is from 10 to 40 gsm and the coat weight of the glossy layer is from 0.1 to 2 gsm. The formulations of the different coating layers are expressed in the Table (b) below. Each number represent the part per weight of each components present in each layer.

TABLE (b)

| Layer | Ingredients | Media A | Media B |
| --- | --- | --- | --- |
| Glossy protective layer | Disperal ®HP-14 | 75 | — |
|  | Cartacoat ®K303C | 25 | — |
|  | PVA 2 | 11 | — |
| Coat-weight |  | 0.5 gsm | — |
| Ink-absorbing layer | Treated Silica | 100 | 100 |
|  | PVA 1 | 21 | 21 |
|  | Boric Acid | 2.5 | 2.5 |

TABLE (b)-continued

| Layer | Ingredients | Media A | Media B |
| --- | --- | --- | --- |
|  | Silwet ®L-7600 | 0.5 | 0.5 |
|  | Glycerol | 1.5 | 1.5 |
|  | Zonyl ®FSN | 0.1 | 0.1 |
| Coat-weight |  | 28 gsm | 28 gsm |

Treated silica is Cab-O-Sil®MS-55 (available from Cabot) treated with ACH and Silquest®A-1110. PVA 1 is Poval®235 available from Kuraray. PVA 2 is Mowiol® 40-88 available from Kuraray. Zonyl®FSN is a fluorosurfactants available from DuPont Inc. Cartacoat®K303C is cationic colloidal silica available from Clariant. Disperal®HP-14 is boehmite available from Sasol technologies Inc. Silwet®L-7600 is a surfactant from GE silicone Inc.

The ink composition, such as describe in table (a) of this example, is printed onto the media A described in table (b), using a HP Black Print Cartridge 94 in a HP Photosmart 8450 printer. The resulting printed article has a gold-like visual appearance, has 20° reflectivity of about 16.5 to 12.2 about % (as measured by BYK "Micro-Tri-Gloss meter") and has a printed feature containing $Fe_3O_4$ particles with a coverage in the range of about 12 to about 18 µg/cm².

The invention claimed is:

1. A printed article with metallic luster and gold-like appearance comprising a printable media on which a printed feature has been formed with an ink composition, wherein:
   a. said ink composition comprises iron oxide pigment particles that have an average particle size in the range of about 3 to about 300 nm;
   b. said printable media contains a bottom supporting substrate and an ink-absorbing layer with pore diameters that are smaller than the average size of the iron oxide pigment particles; and
   c. the ink composition forms onto said printable media a printed feature that has a thickness that is below about 300 nm.

2. The printed article of claim 1, wherein the printable media further comprises a glossy layer having pore diameters that are smaller than the average size of the iron oxide pigment particles of the ink composition.

3. The printed article of claim 1 wherein the printed feature has been formed via inkjet printing technique.

4. The printed article of claim 1, wherein the ink composition forms onto the printable media a printed feature that has a thickness comprised between about 3 and about 200 nm.

5. The printed article of claim 1, wherein the ink composition forms onto the printable media a printed feature that has a thickness comprised between about 10 and about 120 nm.

6. The printed article of claim 1, wherein the ink composition forms onto the printable media a printed feature that has a density in the range of about 2 to about 80 µg/cm².

7. The printed article of claim 1, wherein the ink composition contains magnetite ($Fe_3O_4$) as iron oxide pigment particles.

8. The printed article of claim 1, wherein the iron oxide pigment particles of the ink composition have an average particle size ranging from about 5 to about 200 nm.

9. The printed article of claim 1, wherein the iron oxide pigment particles of the ink composition have an average particle size ranging from about 10 to about 100 nm.

10. The printed article of claim 1 wherein the iron oxide particles present in the ink composition are dispersed with dispersants.

11. The printed article of claim 10 wherein the amount of dispersant used in the iron oxide dispersion varies from about 1 wt % to about 300 wt % of the iron oxide particles content.

12. The printed article of claim 1 wherein the iron oxide particles present in the ink composition are dispersed with polyether alkoxysilane dispersants.

13. The printed article of claim 1, wherein the ink composition comprises an aqueous ink vehicle and a colloid dispersion of iron oxide particles, and wherein said dispersion of iron oxide particles represents from about 0.1 to about 15 wt % of the total weight of the ink composition.

14. The printed article of claim 1, wherein the printable media is a textured printable media.

15. A method for forming a printed article such as defined in claim 1 comprising projecting a stream of droplets of ink composition containing iron oxide pigment particles that have an average particle size in the range of about 3 to about 300 nm onto a printable media, said printable media contains a bottom supporting substrate and has a porous ink-absorbing layer with pore diameters smaller than the average size of the iron oxide pigment particles, in view of forming a gold-like appearance printed feature that has a thickness smaller than about 300 nm.

* * * * *